United States Patent
Bareiss

(10) Patent No.: US 9,630,606 B2
(45) Date of Patent: Apr. 25, 2017

(54) CONTROL DEVICE AND METHOD FOR OPERATING A BRAKING SYSTEM OF A VEHICLE EQUIPPED WITH AN ELECTRIC BRAKE BOOSTER

(71) Applicant: Robert Bosch GmbH, Stuttgart (DE)

(72) Inventor: Alexander Bareiss, Immenstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 87 days.

(21) Appl. No.: 14/666,582

(22) Filed: Mar. 24, 2015

(65) Prior Publication Data
US 2015/0283987 A1    Oct. 8, 2015

(30) Foreign Application Priority Data
Apr. 7, 2014  (DE) .................. 10 2014 206 649

(51) Int. Cl.
*B60T 13/74* (2006.01)
*B60T 13/66* (2006.01)
*B60T 8/171* (2006.01)
*B60T 8/172* (2006.01)

(52) U.S. Cl.
CPC ............ *B60T 13/745* (2013.01); *B60T 8/171* (2013.01); *B60T 8/172* (2013.01); *B60T 13/662* (2013.01)

(58) Field of Classification Search
CPC ...... B60T 13/662; B60T 8/172; B60T 13/745; B60T 7/042; B60T 8/171–8/173; B60T 8/3255–8/3265; B60T 8/44–8/441; B60T 13/10; B60T 13/58; B60T 13/66–13/667; B60T 13/74; B60T 2220/04

USPC ............................................. 701/70, 78, 83
See application file for complete search history.

(56) References Cited

U.S. PATENT DOCUMENTS

| 8,011,184 B2 * | 9/2011 | Ohtani ................. B60T 13/745 60/538 |
| 2008/0265662 A1 * | 10/2008 | Karnjate .................. B60T 7/06 180/65.27 |
| 2010/0062897 A1 * | 3/2010 | Nishino ................ B60T 8/4872 477/29 |
| 2010/0117445 A1 * | 5/2010 | Kato ....................... B60T 7/042 303/11 |
| 2010/0244549 A1 * | 9/2010 | Koshimizu ............. B60T 7/042 303/14 |

(Continued)

FOREIGN PATENT DOCUMENTS

| DE | 10 2008 010 704 | 8/2009 |
| DE | 20 2010 017 605 | 10/2012 |

*Primary Examiner* — Bao Long T Nguyen
(74) *Attorney, Agent, or Firm* — Gerard Messina

(57) ABSTRACT

A control device for a braking system of a vehicle equipped with an electric brake booster includes an activating unit which is configured to output, taking into account at least one provided sensor signal regarding a setpoint brake pressure, at least one brake pressure control signal to the electric brake booster in such a way that, if the setpoint brake pressure is below a predefined limiting value, a brake pressure portion effectuated on the booster side is equal to a difference between the setpoint brake pressure and a brake pressure portion effectuated on the driver side, while once the predefined limiting value is exceeded by the setpoint brake pressure, the brake pressure portion effectuated on the booster side remains constant or decreases.

12 Claims, 1 Drawing Sheet

(56) References Cited

U.S. PATENT DOCUMENTS

| | | | | |
|---|---|---|---|---|
| 2013/0025273 A1* | 1/2013 | Nozawa | ............... | B60T 7/042 |
| | | | | 60/545 |
| 2013/0113270 A1* | 5/2013 | Pursifull | ............... | B60T 8/441 |
| | | | | 303/4 |
| 2014/0257658 A1* | 9/2014 | Shimizu | ............... | B60T 8/17 |
| | | | | 701/70 |
| 2015/0032352 A1* | 1/2015 | Butz | ............... | B60T 7/042 |
| | | | | 701/70 |
| 2015/0046053 A1* | 2/2015 | Gerdes | ............... | B60T 13/662 |
| | | | | 701/70 |
| 2015/0061361 A1* | 3/2015 | Maruo | ............... | B60T 11/224 |
| | | | | 303/10 |
| 2015/0061362 A1* | 3/2015 | Kikawa | ............... | B60T 7/06 |
| | | | | 303/10 |
| 2015/0123457 A1* | 5/2015 | Naito | ............... | B60T 1/10 |
| | | | | 303/3 |
| 2015/0217741 A1* | 8/2015 | Kikawa | ............... | B60L 7/18 |
| | | | | 701/71 |
| 2016/0059836 A1* | 3/2016 | Kim | ............... | B60T 7/042 |
| | | | | 303/10 |
| 2016/0068146 A1* | 3/2016 | Matsunaga | ............... | B60T 1/10 |
| | | | | 60/545 |
| 2016/0193990 A1* | 7/2016 | Drumm | ............... | B60T 7/042 |
| | | | | 701/70 |

* cited by examiner

CONTROL DEVICE AND METHOD FOR OPERATING A BRAKING SYSTEM OF A VEHICLE EQUIPPED WITH AN ELECTRIC BRAKE BOOSTER

BACKGROUND OF THE INVENTION

1. Field of the Invention

The present invention relates to a control device for a braking system of a vehicle equipped with an electric brake booster. Moreover, the present invention relates to an electric brake booster, a hydraulic unit for a braking system and a braking system for a vehicle. In addition, the present invention relates to a method for operating a braking system of a vehicle equipped with an electric brake booster.

2. Description of the Related Art

An electric/electromechanical brake booster is described in published German utility model document DE 20 2010 017 605 U1. For controlling/regulating the brake booster, a control unit is also described, which controls the brake booster based on signals of a sensor device, for example, a force sensor for determining a driver braking force. In addition, a brake pressure control system and/or a brake slip control system, for example, an ESP/ABS hydraulic unit of the braking system equipped with the brake booster, is/are to be activatable with the aid of the control unit.

BRIEF SUMMARY OF THE INVENTION

The present invention provides a control device for a braking system of a vehicle equipped with an electric brake booster, an electric brake booster, a hydraulic unit for a braking system, a braking system for a vehicle and a method for operating a braking system of a vehicle equipped with an electric brake booster.

The present invention provides options for equipping a braking system with a cost-effective, smaller and/or lighter electric brake booster. For example, when using the present invention, the standard requirement of equipping an electric brake booster with a comparably powerful motor and with a transmission which is suitable for cooperating with the powerful motor is omitted. In this way, the manufacturing costs for a brake booster which is deployable in the braking system may be reduced significantly with the aid of the present invention. Moreover, an electric brake booster which is designed to be lighter is usable in the braking system so that equipping the braking system with the brake booster hardly contributes to an increase in the total weight of the complete system. The brake booster may also be designed to be much smaller when using the present invention than in the related art. The smaller electric brake booster implementable according to the present invention results in significantly improved options for its arrangement in/at the braking system. For example, it is possible without any problems to install the smaller brake booster in the engine compartment, in particular in a design having multiple boxes.

Furthermore, the smaller design of the electric brake booster implementable with the aid of the present invention makes significantly improved options possible instead of a conventional brake assembly. In favorable cases, even an integration of the electric brake booster together with the hydraulic unit (ESP/ABS system) into one single unit is possible, the newly gained unit being nevertheless installable in the conventional manner.

In one advantageous specific embodiment of the control device, the activating unit is also designed to establish, taking the at least one provided sensor signal into account, at least one second setpoint variable regarding a setpoint functionality to be carried out with the aid of at least one hydraulic component of the braking system, and to output at least one hydraulic control signal corresponding to the at least one second setpoint variable to the at least one hydraulic component. The at least one hydraulic component of the braking system may be a subunit of a hydraulic unit (ESP/ABS system) of the braking system. The at least one hydraulic component is at least one pump motor, at least one pump, at least one plunger and/or at least one valve, in particular at least one wheel inlet valve, at least one wheel outlet valve, at least one high-pressure switching valve, at least one switchover valve and/or at least one shut-off valve, for example. The examples listed here for the at least one hydraulic component activatable with the aid of the control device are, however, only to be interpreted as examples. The shared controllability of the at least one hydraulic component together with the electric brake booster reduces an installation space requirement and manufacturing costs for electronics suitable for it.

However, it is pointed out that designing the control device to also activate the at least one hydraulic component is optional. For example, the braking system may also include at least one controller designed for activating the at least one hydraulic component in addition to the control device. With the electrical separation thus possible between the control device and the one further controller, an improved backup operation is ensured.

In one advantageous refinement, the activating unit may also be designed to establish the at least one first setpoint variable and the at least one second setpoint variable in such a way that, provided that the setpoint brake pressure requested for the at least one wheel brake cylinder is below a predefined limiting value, the brake pressure portion effectuated on the booster side to be generated in the respective wheel brake cylinder equals a difference between the setpoint brake pressure requested for the respective wheel brake cylinder and the achieved brake pressure portion effectuated on the driver side in the respective wheel brake cylinder, while, once the predefined limiting value is exceeded by the setpoint brake pressure requested for the at least one wheel brake cylinder, the brake pressure portion effectuated on the booster side to be generated in the respective wheel brake cylinder remains constant or decreases, and a brake pressure portion effectuated on the hydraulic side may be generated in the respective wheel brake cylinder with the aid of the at least one hydraulic component, this brake pressure portion being equal to a pressure difference between the requested setpoint brake pressure for the respective wheel brake cylinder and the sum of the brake pressure portion effectuated on the driver side and the brake pressure portion effectuated on the booster side in the respective wheel brake cylinder. From the exceedance of the predefined limiting value by the requested setpoint brake pressure, the brake pressure increase intended by the driver may therefore be supported in the at least one wheel brake cylinder with the aid of the at least one hydraulic component. In this way, a relatively high setpoint brake pressure in the at least one wheel brake cylinder is still implementable without the electric brake booster having to be designed for a significant brake pressure increase. Instead, the small size, the light weight, and the comparably low-power motor and/or the relatively cost-effective thread of the electric brake booster installed in the braking system may be compensated for with the aid of the use according to the present invention of the at least one hydraulic component.

The present invention may thus make use of the fact that the braking system equipped with the electric brake booster, which generally also includes the at least one hydraulic component, has two functionally diverse partial components for changing an instantaneously present brake pressure in its at least one wheel brake cylinder. With the aid of the present invention, the two functionally diverse partial components (i.e., the electromechanical brake booster and the at least one hydraulic component) may adjust their performances to each other in such a way that a part of the redundancies is dispensed with and a significant improvement of the brake boost is thus achievable. This applies independently of whether the two partial components are present as separate structural units or combined into one single structural unit.

The at least one hydraulic component of the braking system is mostly capable of handling brake pressures of up to 300 bar or higher. The pumps and/or valves present as hydraulic components in an ESP/ABS system are frequently designed to build up a brake pressure of at least 300 bar in the at least one wheel brake cylinder of the braking system. This property of the at least one hydraulic component of a braking system may be used to reduce an installation space requirement, a weight and/or the manufacturing costs of the cooperating electric brake booster. Likewise, a functional capability and a mounting capability of the respective electric brake booster may be increased.

For example, the predefined limiting value may be less than or equal to 90 bar. The predefined limiting value may be, for example, between 50 bar and 90 bar, in particular between 50 bar and 70 bar or between 70 bar and 90 bar. Moreover, a predefined limiting value between 30 bar and 50 bar is also advantageous. Generally, a driver almost never requests a setpoint brake pressure of over 30 bar. With the aid of the present invention it is thus ensurable that, in standard braking situations, the driver hardly feels any vibrations, for example pump pulsations, at the brake actuating element/brake pedal due to the exclusive use of the electric brake booster for the brake pressure increase (while not using the at least one hydraulic component). The setpoint brake pressure predefined by the driver will be implemented in the at least one wheel brake cylinder using the at least one hydraulic component in emergency braking situations only, the driver hardly taking note of vibrations at the brake actuating element/brake pedal in such situations.

In one advantageous refinement, the activating unit is also designed to activate the at least one hydraulic component with the aid of a new establishment of at least the second setpoint variable in the event of a failure of the electric brake booster, in such a way that the respective setpoint brake pressure is achievable and/or to activate the electric brake booster with the aid of a new establishment of the at least one first setpoint variable in the event of a failure of the at least one hydraulic component in such a way that the respective setpoint brake pressure is achievable. Therefore, in the event of a failure of a subsystem, the other subsystem/ the remaining system may still individually achieve the requested/required braking effect.

The above-described advantages may also be implemented in an electric brake booster including such a control device.

Similarly, a hydraulic unit including a corresponding brake booster contributes to realizing the described advantages.

A braking system including such a control device and/or the hydraulic unit, the electric brake booster and the at least one hydraulic component ensure the described advantages.

The electric brake booster is preferably suppliable with current independently of the at least one hydraulic component. For example, the electric brake booster and the at least one hydraulic component may be connected to different power supply systems.

In addition, carrying out the corresponding method for operating a braking system of a vehicle equipped with an electric brake booster also realizes the advantages described above. It is pointed out that the method according to the specific embodiment of the control device described above may be further refined.

DETAILED DESCRIPTION OF THE INVENTION

Figure 1:
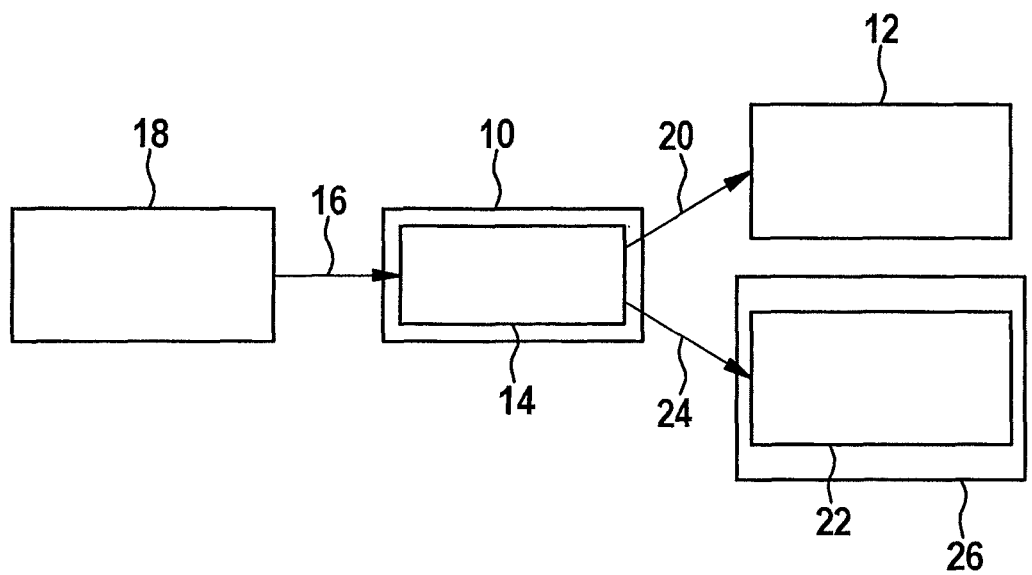
FIG. 1 shows a schematic illustration of one specific embodiment of the control device.

FIG. 1 shows a schematic illustration of one specific embodiment of the control device.

Control device 10 shown schematically in FIG. 1 is designed to cooperate with a (only partially outlined) braking system of a vehicle which includes an electric brake booster 12. Electric brake booster 12 may also be referred to as an electromechanical brake booster 12. It is pointed out that the usability of control device 10 is not limited to a specific type of electric brake booster 12. Control device 10 may be installed together with the braking system equipped with electric brake booster 12 in/on a vehicle, in particular also in/on an electric vehicle or a hybrid vehicle.

Control device 10 includes an activating unit 14 which is designed to establish at least one first setpoint variable regarding a brake pressure portion effectuated on the booster side to be generated in at least one wheel brake cylinder of the braking system with the aid of electric brake booster 12. The brake pressure portion effectuated on the booster side is to be understood to mean at least a proportion of a (total) brake pressure in the respective wheel brake cylinder which is (exclusively) built up with the aid of an exerted/exertable booster force of the electric brake booster 12 in the respective wheel brake cylinder. In other words, the brake pressure portion effectuated on the booster side results from the booster force of electric brake booster 12 and a conversion relation between booster force and brake pressure (or a corresponding transformation ratio between booster force and brake pressure) structurally established on the braking system. For example, the booster force exerted by electric brake booster 12 is thus (directly or indirectly) transferable to at least one force-pressure-transformer component of the braking system in such a way that an (additional) pressure increase triggered exclusively with the aid of the booster force is transferable as a brake pressure portion effectuated on the booster side to the at least one wheel brake cylinder.

In particular the brake pressure portion effectuated on the booster side may be built up (with the aid of electric brake booster 12) in addition to a brake pressure portion effectuated on the driver side achievable in the respective wheel brake cylinder with the aid of a driver brake force of the driver. The brake pressure portion effectuated on the driver side may be understood to mean at least a proportion of the (total) brake pressure in the respective wheel brake cylinder which is built up (exclusively) with the aid of the driver brake pressure in the respective wheel brake cylinder. The brake pressure portion effectuated on the driver side generally results from the driver brake force and a conversion relation between driver brake force and brake pressure, or a corresponding transformation ratio between driver brake force and brake pressure structurally established on the braking system. Therefore, with the aid of the at least one force-pressure-transformer component of the braking system, the driver brake force is also convertible into an (additional) pressure increase which is transferable as the brake pressure portion effectuated on the driver side to the at least one wheel brake cylinder. If electric brake booster 12 is not used, and no further braking system component is activated for brake pressure increase, the (total) brake pressure present in the at least one wheel brake cylinder is generally equal to the brake pressure portion effectuated on the driver side.

The at least one first setpoint variable established by activating unit 14 correlates to the booster force to be exerted with the aid of electric brake booster 12, or to the brake pressure portion effectuated on the booster side. The at least one first setpoint variable may be, for example, the booster force to be exerted, the intended brake pressure portion effectuated on the booster side, a voltage to be applied to electric brake booster 12, a current intensity to be supplied to electric brake booster 12 and/or a setpoint operating mode of electric brake booster 12. The examples described here for the at least one first setpoint variable are to be interpreted only as examples, however.

Establishment of the at least one first setpoint variable is carried out taking into account at least one provided sensor signal 16 regarding a setpoint brake pressure requested by a driver of the vehicle for the at least one wheel brake cylinder of the braking system. The at least one provided sensor signal 16 may, for example, be output by at least one brake actuating element sensor 18. For this purpose, the at least one brake actuating element sensor 18 may be designed to ascertain a brake actuation force of an instantaneous actuation of a brake actuating element of the braking system by the driver, and to output the at least one corresponding sensor signal 16 to control device 10. Examples for the ascertainable brake actuation force are an adjustment travel of the brake actuating element (brake actuating travel, pedal travel), an adjustment travel of a force transmission component (rod travel) connected to the brake actuating element, a driver brake pressure and/or the driver brake force. Brake actuating element sensor 18 may thus be, for example, a braking distance sensor, a rod travel sensor, a differential travel sensor, a driver brake pressure sensor and/or a driver brake force sensor. Thus a plurality of sensor types is usable for the at least one brake actuating element sensor 18. Only as an example, the brake actuating element of the braking system may be a brake pedal.

Activating unit 14 is designed to output at least one brake booster control signal 20 corresponding to the at least one first setpoint variable to electric brake booster 12. Electric brake booster 12 is designed in such a way that it is activatable with the aid of the at least one brake booster control signal 20 in such a way that a brake pressure portion effectuated on the booster side which corresponds to the at least one first setpoint variable is effectuatable with the aid of electric brake booster 12 in the at least one wheel brake cylinder of the braking system.

Activating unit 14 is also designed to establish the at least one first setpoint variable in such a way that, if the setpoint brake pressure requested for the at least one wheel brake cylinder is below a predefined limiting value, the brake pressure portion effectuated on the booster side to be generated in the respective wheel brake cylinder (with the aid of electric brake booster 12) equals a difference between the setpoint brake pressure requested for the respective wheel brake cylinder and the achieved brake pressure portion effectuated on the driver side in the respective wheel brake cylinder (with the aid of the driver brake force). In other words, activating unit 14 is designed to activate, when a requested setpoint brake pressure is below the predefined limiting value, electric brake booster 12 in such a way that a boost/increase of the total brake pressure present in the respective wheel brake cylinder may be effectuated by the difference between the requested setpoint brake pressure and the brake pressure portion effectuated on the driver side (with the aid of the driver brake force) exclusively with the aid of electric brake booster 12.

However, once the predefined limiting value is exceeded by the setpoint brake pressure requested for the at least one wheel brake cylinder, activating unit 14 is designed to establish the at least one first setpoint variable in such a way that the brake pressure portion effectuated on the booster side to be generated in the respective wheel brake cylinder remains constant or decreases. Therefore, the brake pressure portion effectuated on the booster side generated with the aid of electric brake booster 12 (and the conversion relation between booster force and brake pressure) in the respective wheel brake cylinder is smaller once the predefined limiting value is exceeded by the setpoint brake pressure than the difference between the requested setpoint brake pressure and the brake pressure portion effectuated on the driver side (achieved with the aid of the driver brake pressure). Once the predefined limiting value is exceeded by the requested setpoint brake pressure, an exclusive use of electric brake booster 12 for a brake pressure boost in the respective wheel brake cylinder by the difference between the requested setpoint brake pressure and the brake pressure portion (achieved with the aid of the driver brake pressure) effectuated on the driver side is omitted.

Since activating unit 14 is designed to exclusively use electric brake booster 12 for a requested setpoint brake pressure below the predefined limiting value for a brake boost, hardly any vibrations occur at the brake actuating element/brake pedal as long as the predefined limiting value is not exceeded. For the decelerations with a setpoint brake pressure below the predefined limiting value, activating unit 14 thus makes use of the fact that the brake boost effectuatable with the aid of electric brake booster 12 is not actually perceivable by the driver at the brake actuating element/brake pedal. While mainly in the case of a brake boost effectuated with the aid of at least one pump, pulsations/pump pulsations at the brake actuating element/brake pedal are noticeable by the driver, the driver hardly perceives vibrations during activities by electric brake booster 12.

At the same time, activating unit 14 enables the use of a cost-effective, light and/or small electric brake booster 12 in the braking system equipped with it. Since the exceedance of the predefined limiting value by the requested setpoint brake pressure does not trigger an increased use of electric brake booster 12, electric brake booster 12 cooperating with control device 10 does not require a powerful motor or a complex/expensive transmission. Moreover, electric brake booster 12, used together with control device 10, may have smaller and lighter movable components. Thus a small and light electric brake booster 12 is usable together with control device 10 in the braking system. The small and light electric brake booster 12 usable due to the use of control device 10 may be installed comparatively easily in the vehicle. This also applies to a direct mounting of electric brake booster 12 in the engine compartment. In particular a mounting of the small and light electric brake booster 12 to the surroundings of the brake actuating element/brake pedal is made significantly easier with the aid of control device 10. Since in this case the usual projection of the brake actuating element/brake pedal into the immediate vicinity of the driver is also preventable, an actuation of the brake actuating element/brake pedal is easier and safer. Moreover, due to the possibility of the smaller and lighter design of the movable components installed in electric brake booster 12, their dynamics and mobility are automatically improved.

Control device 10 may be designed to only activate electric brake booster 12. In the specific embodiment shown in FIG. 1, activating unit 14 is, however, designed to also establish at least one second setpoint variable regarding a setpoint function to be carried out with the aid of the at least one hydraulic component 22 of the braking system, taking into account the at least one available sensor signal 16. With the aid of activating unit 14, at least one hydraulic control signal 24, which corresponds to the at least one second setpoint variable, may subsequently be output to the at least one hydraulic component 22. The at least one hydraulic component 22 may optionally be designed to be mechanical, electrical and/or hydraulic. The at least one hydraulic component 22 may, for example, be at least one pump, at least one pump motor, at least one plunger and/or at least one valve. In particular, at least one return pump or at least one motor of a return pump may be activatable as the at least one hydraulic component 22 with the aid of the at least one hydraulic control signal 24. Examples for the at least one valve usable as hydraulic component 22 are at least one wheel inlet valve, at least one wheel outlet valve, at least one high-pressure switching valve, at least one switchover valve and/or at least one shut-off valve. Thus a plurality of hydraulic exemplary embodiments is activatable as the at least one hydraulic component 22 with the aid of activating unit 14.

Activating unit 14 is preferably designed to activate the at least one hydraulic component 22 in such a way that the at least one hydraulic component 22 is usable for brake boosting. However, it is pointed out that, if the setpoint brake pressure requested for the at least one wheel cylinder is below the predefined limiting value, (also in this case) the brake boost in the respective wheel brake cylinder takes place exclusively with the aid of electric brake booster 12 by the difference between the setpoint brake pressure and the brake pressure portion effectuated on the driver side. Preferably, the at least one hydraulic component 22 is controlled with the aid of the at least one hydraulic control signal 24 in an inactive state as long as the requested setpoint brake pressure is below a predefined limiting value. Only once the predefined limiting value is exceeded by the setpoint brake pressure requested for the at least one wheel brake cylinder is activating unit 14 designed to establish the at least one second setpoint variable (together with the at least one first setpoint variable) in such a way that a brake pressure portion effectuated on the hydraulic-side may be generated with the aid of the at least one hydraulic component 22, which equals a pressure difference between the setpoint brake pressure requested for the respective wheel brake cylinder, and a sum from the brake pressure portion effectuated on the driver side and the brake pressure portion effectuated on the booster side in the respective wheel brake cylinder. A brake pressure portion effectuated on the hydraulic side is to be understood to mean a portion of the (total) brake pressure in the respective wheel brake cylinder, which is exclusively attributable to the operation of the at least one hydraulic component 22 activated by activating unit 14. When the at least one hydraulic component 22 is in its deactivated state, the brake pressure portion effectuated on the hydraulic side is therefore equal to zero.

Thus the driver brake request may be reliably fulfilled even when the predefined limiting value is exceeded by the requested setpoint brake pressure, although the brake pressure portion effectuated on the booster side generated/to be generated with the aid of electric brake booster 12 in the respective wheel brake cylinder remains constant or decreases. The control device makes use of the fact that brake pressures of up to 300 bar or higher may be built up in the at least one wheel brake cylinder with the aid of the above-named exemplary embodiments of the at least one hydraulic component 22.

Even when the driver brake pressure and the booster force of electric brake booster 12 are insufficient for producing such a high setpoint brake pressure, the at least one hydraulic component 22 may be used to reliably fulfill the driver brake request. This applies independently of whether the at least one hydraulic component 22 is designed to be mechanical, electrical or hydraulic. Even modulations, for example reductions or increases of the total brake pressure present in the respective wheel brake cylinder, may be carried out with the aid of the at least one hydraulic component 22 also in the event of a strong deceleration of the vehicle.

Preferably, the at least one hydraulic component 22 is a subunit of a hydraulic unit 26 (ESP/ABS hydraulic unit) of the braking system. Thus at least one subunit already present in a standard braking system may be used as the at least one hydraulic component 22. There is thus no requirement to equip the braking system with additional components.

The predefined limiting value may, for example, be less than or equal to 90 bar. In this case, electric brake booster 12 usable with control device 10 is to be designed only for a maximum output power which is at approximately 50% of the power of a brake booster activatable in a conventional manner. This also improves a controllability of electric brake booster 12 used together with control device 10.

The reductions in the requirements of electric brake booster 12 achievable with the aid of control device 10 also enable its integration into hydraulic unit 26 (ESP/ABS hydraulic unit.)

It is pointed out that a driver generally almost never requests setpoint brake pressures between 50 bar and 90 bar. It is thus advantageous if the predefined limiting value is between 50 bar and 90 bar. It is also pointed out that a limiting value exceeding 30 bar is advantageous, since in this case emergency braking functions may be carried out better during the backup. This means that the braking effect required by law may still be achieved by each single subsystem/booster element even without the other (failed) subsystem.

Figure 2:
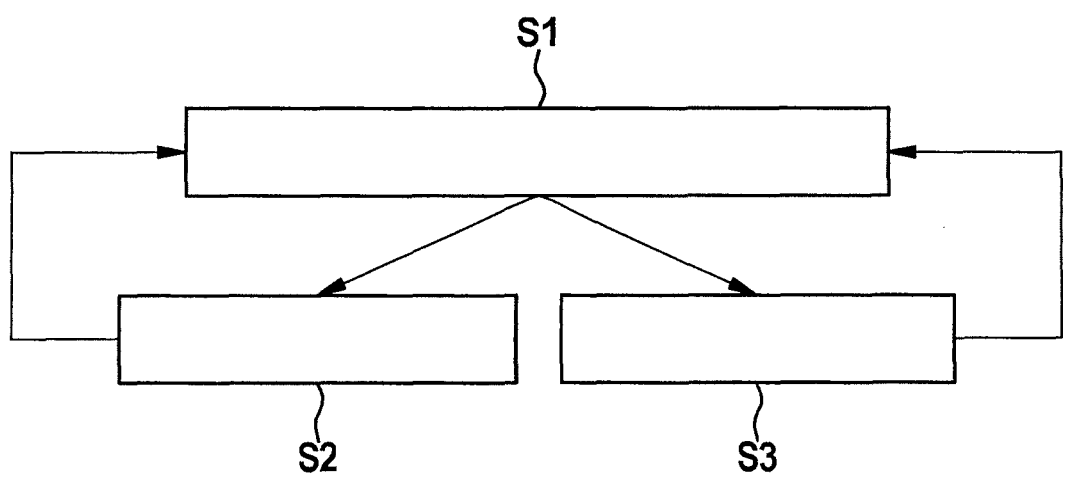
FIG. 2 shows a flow chart to explain one specific embodiment of the method for operating a braking system of a vehicle equipped with an electric brake booster.

FIG. 2 shows a flow chart to explain one specific embodiment of the method for operating a braking system of a vehicle equipped with an electric brake booster.

The method described below may, for example, be carried out with the aid of the above-described control device or a braking system cooperating with the control device. However, it is to be noted that the ability to carry out the method is not limited to the use of such a control device.

In a method step S1, a setpoint braking pressure requested by a driver of the vehicle for at least one wheel brake cylinder of the braking system is ascertained. To ascertain the setpoint brake pressure requested for the at least one wheel brake cylinder, an actuating force of an actuation of a brake actuating element of the braking system by the driver may, for example, be evaluated.

If the setpoint brake pressure requested for the at least one wheel brake cylinder is below a predefined limiting value, a method step S2 is carried out. In method step S2, the electric brake booster is operated/activated in such a way that a brake pressure portion effectuated on the booster side generated in the respective wheel brake cylinder with the aid of the electric brake booster, this brake pressure portion being generated in addition to a brake pressure portion effectuated on the driver side achievable with the aid of a driver brake pressure of the driver in the respective wheel brake cylinder, is equal to a difference between the setpoint brake pressure requested for the respective wheel brake cylinder and the brake pressure portion effectuated on the driver side achieved in the respective wheel brake cylinder.

Once the predefined limiting value is exceeded by the setpoint brake pressure requested for the at least one wheel brake cylinder, a method step S3 is carried out instead of method step S2. During method step S3, the electric brake booster is operated/activated in such a way that the brake pressure portion effectuated on the booster side to be generated in the respective wheel brake cylinder remains constant or decreases.

Preferably, at least one hydraulic component of the braking system is also operated/activated when carrying out the method, taking into account the setpoint brake pressure requested for the at least one wheel brake cylinder. In one preferred specific embodiment, once the predefined limiting value is exceeded by the setpoint brake pressure requested for the at least one wheel brake cylinder (i.e., during method step S3), the at least one hydraulic component is operated/activated in such a way that a brake pressure portion effectuated on the hydraulic side is generated in the respective wheel brake cylinder with the aid of the at least one hydraulic component, the brake pressure portion being equal to a pressure difference between the setpoint brake pressure requested for the respective wheel brake cylinder and a sum of the brake pressure portion effectuated on the driver side and the brake pressure portion effectuated on the booster side in the respective wheel brake cylinder. In contrast, during method step S2, the at least one hydraulic component may be controlled in/remain in its deactivated state.

What is claimed is:

1. A control device for a braking system of a vehicle equipped with an electric brake booster, the control device comprising:
an activating unit configured to:
establish, taking into account at least one provided sensor signal regarding a setpoint brake pressure requested by a driver of the vehicle for at least one wheel brake cylinder of the braking system, at least a first setpoint variable regarding a brake pressure portion from the booster to be generated in the respective wheel brake cylinder with the aid of the electric brake booster, wherein the brake pressure portion from the booster is in addition to a brake pressure portion from the driver achievable in the respective wheel brake cylinder with the aid of a brake pressure applied by the driver; and
output to the electric brake booster at least one brake pressure booster control signal which corresponds to the at least one first setpoint variable;
wherein the activating unit is configured to establish the at least one first setpoint variable in such a way that,
(i) provided the setpoint brake pressure requested for the at least one wheel brake cylinder is below a predefined limiting value, the brake pressure portion from the booster to be generated in the respective wheel brake cylinder equals a difference between the setpoint brake pressure requested for the respective wheel brake cylinder and the brake pressure portion from the driver in the respective wheel brake cylinder, and
(ii) once the predefined limiting value is exceeded by the setpoint brake pressure requested for the at least one wheel brake cylinder, the brake pressure portion from the booster to be generated in the respective wheel brake cylinder one of remains constant or decreases.

2. The control device as recited in claim 1, wherein the activating unit is further configured to (i) establish, taking into account the at least one provided sensor signal, at least one second setpoint variable regarding a setpoint functionality to be carried out with the aid of at least one hydraulic component of the braking system, and (ii) output at least one hydraulic control signal corresponding to the at least one second setpoint variable to the at least one hydraulic component.

3. The control device as recited in claim 2, wherein the activating unit is further configured to establish the at least one first setpoint variable and the at least one second setpoint variable in such a way that:
(i) if the setpoint brake pressure requested for the at least one wheel brake cylinder is below a predefined limiting value, the brake pressure portion from the booster to be generated in the respective wheel brake cylinder equals the difference between the setpoint brake pressure requested for the respective wheel brake cylinder and the brake pressure portion from the driver in the respective wheel brake cylinder; and
(ii) once the predefined limiting value is exceeded by the setpoint brake pressure requested for the at least one wheel brake cylinder, the brake pressure portion from the booster to be generated in the respective wheel brake cylinder one of remains constant or decreases, and a brake pressure portion from the hydraulic component with the aid of the at least one hydraulic component is generated in the respective wheel brake cylinder, the brake pressure portion from the hydraulic component being equal to a pressure difference between the setpoint brake pressure requested for the respective wheel brake cylinder and a sum of the brake pressure portion from the driver and the brake pressure portion from the booster in the respective wheel brake cylinder.

4. The control device as recited in claim 2, wherein the predefined limiting value is no greater than 90 bar.

5. The control device as recited in claim 2, wherein the activating unit is further configured to at least one of:
(i) activate, in the event of a failure of the electric brake booster, the at least one hydraulic component in such a way that, with the aid of a new establishment of at least the second setpoint variable, the respective setpoint brake pressure is achieved; and
(ii) activate, in the event of a failure of the at least one hydraulic component, the electric brake booster in such a way that, with the aid of a new establishment of the at least one first setpoint variable, the respective setpoint brake pressure is achieved.

6. The control device as recited in claim 5, wherein the control device is part of the electric brake booster.

7. The control device as recited in claim 6, wherein the electric brake booster is part of a braking system which further includes a hydraulic unit.

8. A braking system for a vehicle, comprising:
an electric brake booster;
at least one hydraulic component; and
a control device including:
   an activating unit configured to:
      establish, taking into account at least one provided sensor signal regarding a setpoint brake pressure requested by a driver of the vehicle for at least one wheel brake cylinder of the braking system, at least a first setpoint variable regarding a brake pressure portion from the booster to be generated in the respective wheel brake cylinder with the aid of the electric brake booster, wherein the brake pressure portion from the booster is in addition to a brake pressure portion from the driver achievable in the respective wheel brake cylinder with the aid of a brake pressure applied by the driver; and
      output to the electric brake booster at least one brake pressure booster control signal which corresponds to the at least one first setpoint variable;
   wherein the activating unit is configured to establish the at least one first setpoint variable in such a way that,
      (i) provided the setpoint brake pressure requested for the at least one wheel brake cylinder is below a predefined limiting value, the brake pressure portion from the booster to be generated in the respective wheel brake cylinder equals a difference between the setpoint brake pressure requested for the respective wheel brake cylinder and the brake pressure portion from the driver in the respective wheel brake cylinder, and
      (ii) once the predefined limiting value is exceeded by the setpoint brake pressure requested for the at least one wheel brake cylinder, the brake pressure portion from the booster to be generated in the respective wheel brake cylinder one of remains constant or decreases.

9. The braking system as recited in claim 8, wherein the electric brake booster is supplied with current independently of the at least one hydraulic component.

10. A method for operating a braking system of a vehicle equipped with an electric brake booster, comprising:
   ascertaining a setpoint brake pressure requested by a driver of the vehicle for at least one wheel brake cylinder;
   if the setpoint brake pressure requested for the at least one wheel brake cylinder is below a predefined limiting value, operating the electric brake booster in such a way that a brake pressure portion from the booster is generated with the aid of the electric brake booster in the respective wheel brake cylinder, the brake pressure portion from the booster is in addition to a brake pressure portion from the driver achievable with the aid of a brake pressure applied by the driver in the respective wheel brake cylinder, and is equal to a difference between the setpoint brake pressure requested for the respective wheel brake cylinder and the brake pressure portion from the driver achieved in the respective wheel brake cylinder; and
   once the predefined limiting value is exceeded by the setpoint brake pressure requested for the at least one wheel brake cylinder, operating the electric brake booster in such a way that the brake pressure portion from the booster to be generated in the respective wheel brake cylinder one of remains constant or decreases.

11. The method as recited in claim 10, wherein, taking into account the setpoint brake pressure requested for the at least one wheel brake cylinder, at least one hydraulic component of the braking system is also operated.

12. The method as recited in claim 11, wherein once the predefined limiting value is exceeded by the setpoint brake pressure requested for the at least one wheel brake cylinder, the at least one hydraulic component is operated in such a way that a brake pressure portion from the hydraulic component is generated in the respective wheel brake cylinder with the aid of the at least one hydraulic component, the brake pressure portion from the hydraulic component being equal to a pressure difference between the setpoint brake pressure requested for the respective wheel brake cylinder and a sum of the brake pressure portion from the driver and the brake pressure portion from the booster in the respective wheel brake cylinder.

* * * * *